Dec. 10, 1929.   H. ANDERSON ET AL   1,738,511
MACHINE FOR CLOSING SACKS
Filed Jan. 6, 1928   15 Sheets-Sheet 2

Inventors:
H. Anderson.
F. O. Lindgren.
By Whiteley and Ruckman
Attorneys.

Dec. 10, 1929.  H. ANDERSON ET AL  1,738,511
MACHINE FOR CLOSING SACKS
Filed Jan. 6, 1928  15 Sheets-Sheet 6

Inventors:
H. Anderson.
F. O. Lindgren.
By Whiteley and Ruckman
Attorneys.

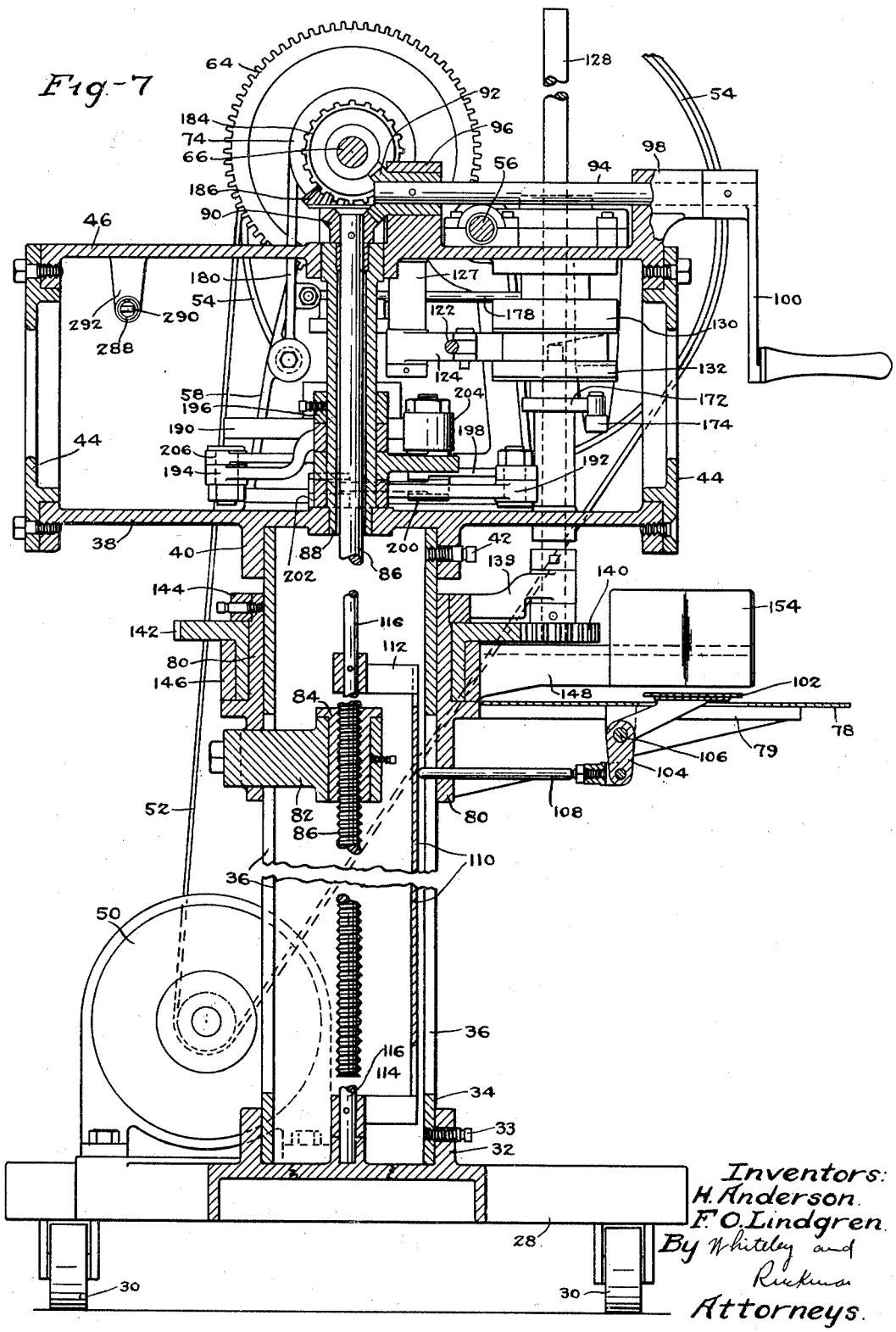

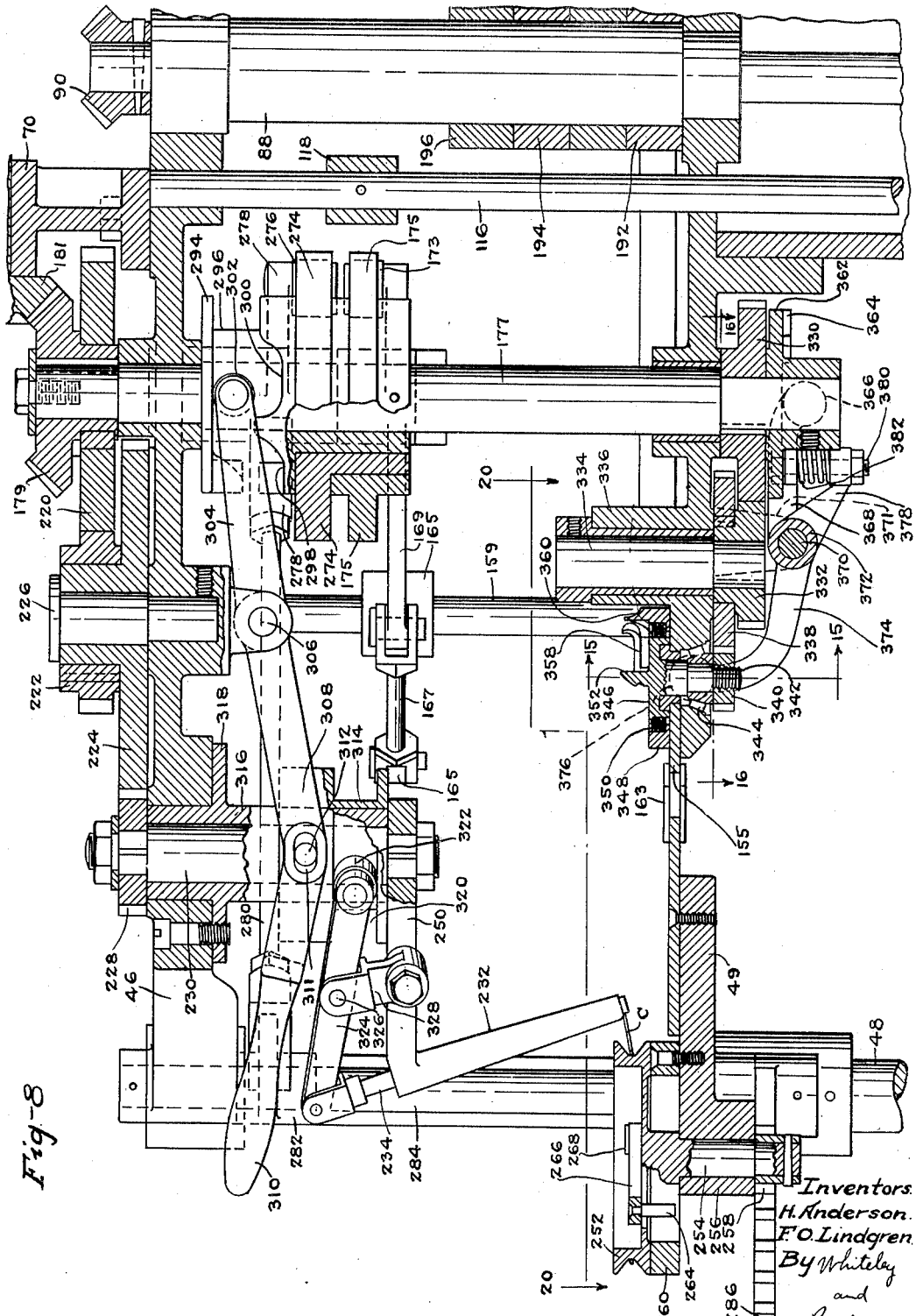

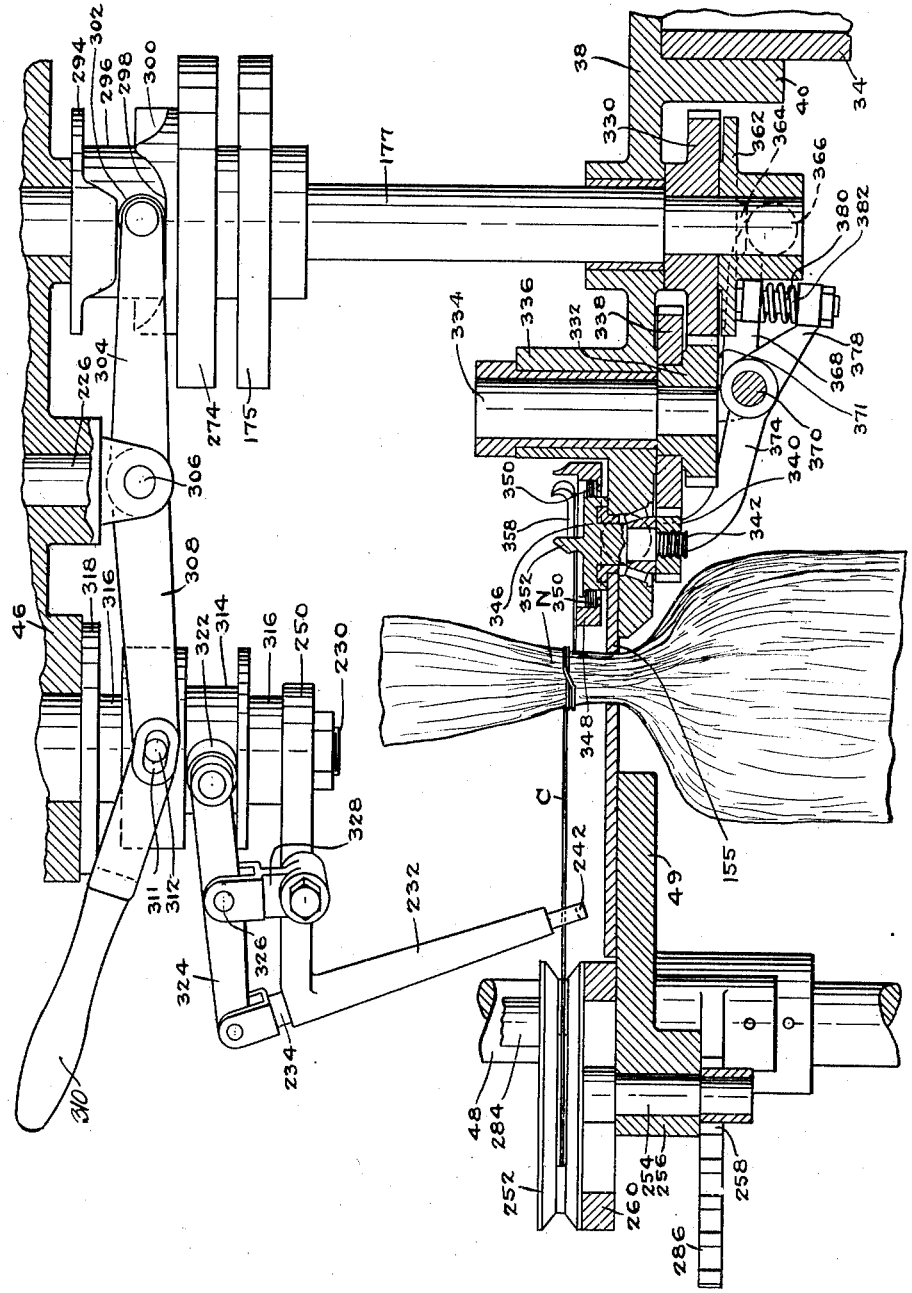

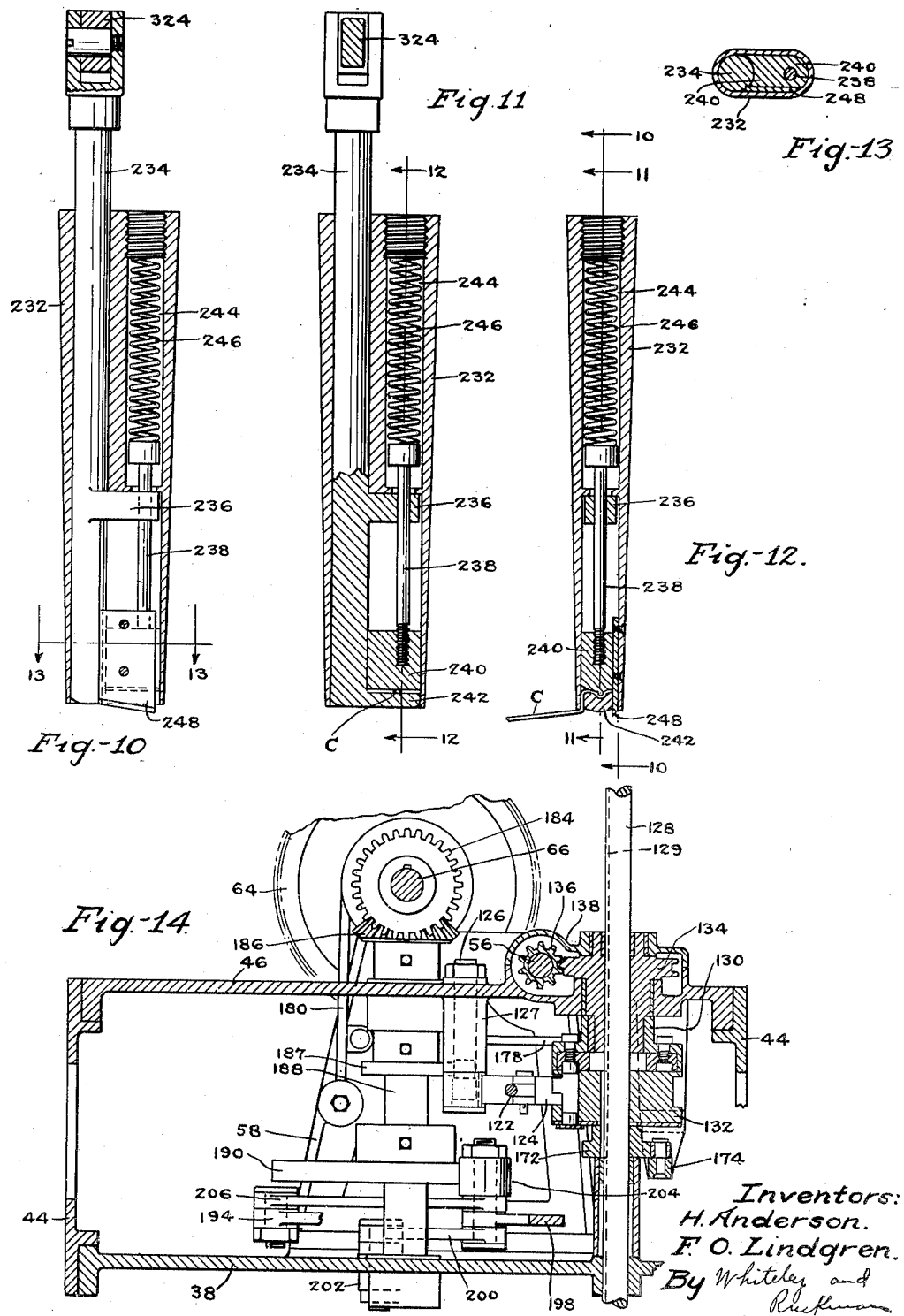

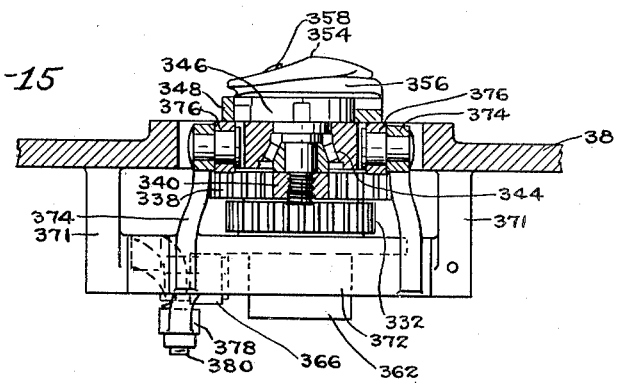
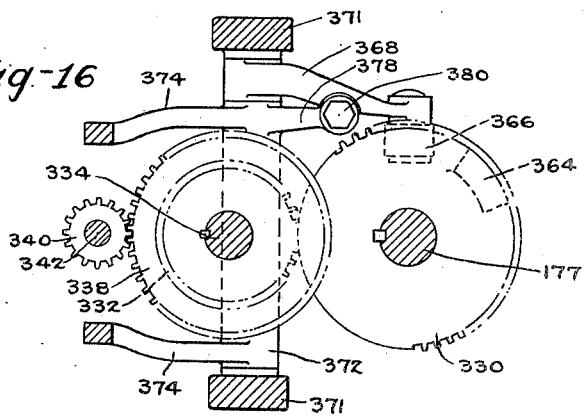
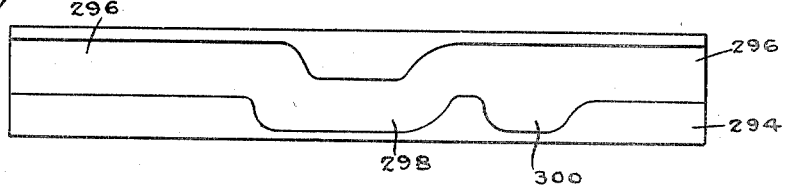
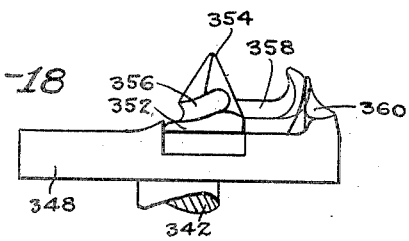
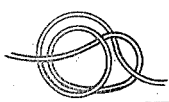

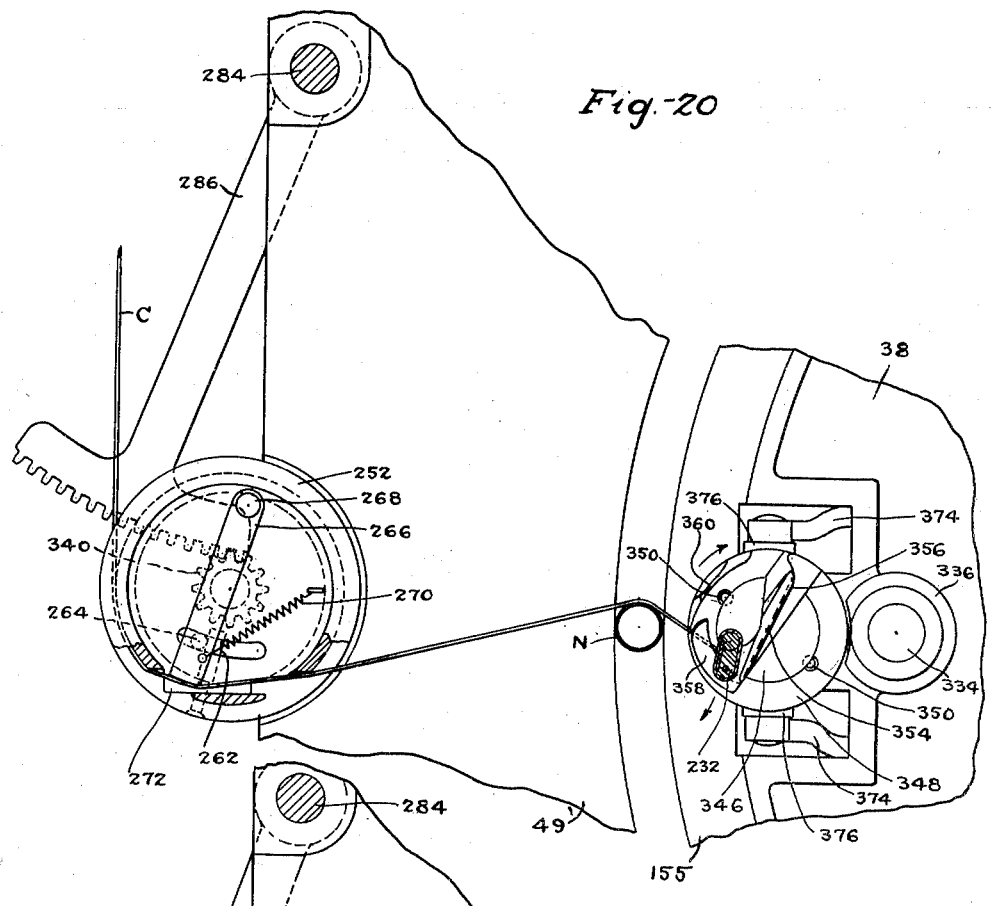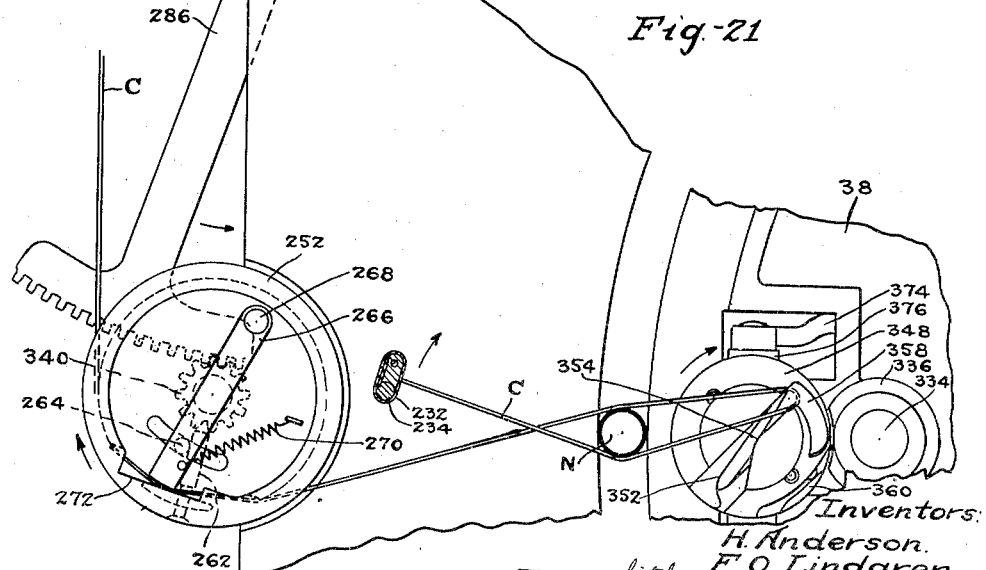

Dec. 10, 1929.  H. ANDERSON ET AL  1,738,511
MACHINE FOR CLOSING SACKS
Filed Jan. 6, 1928  15 Sheets-Sheet 13

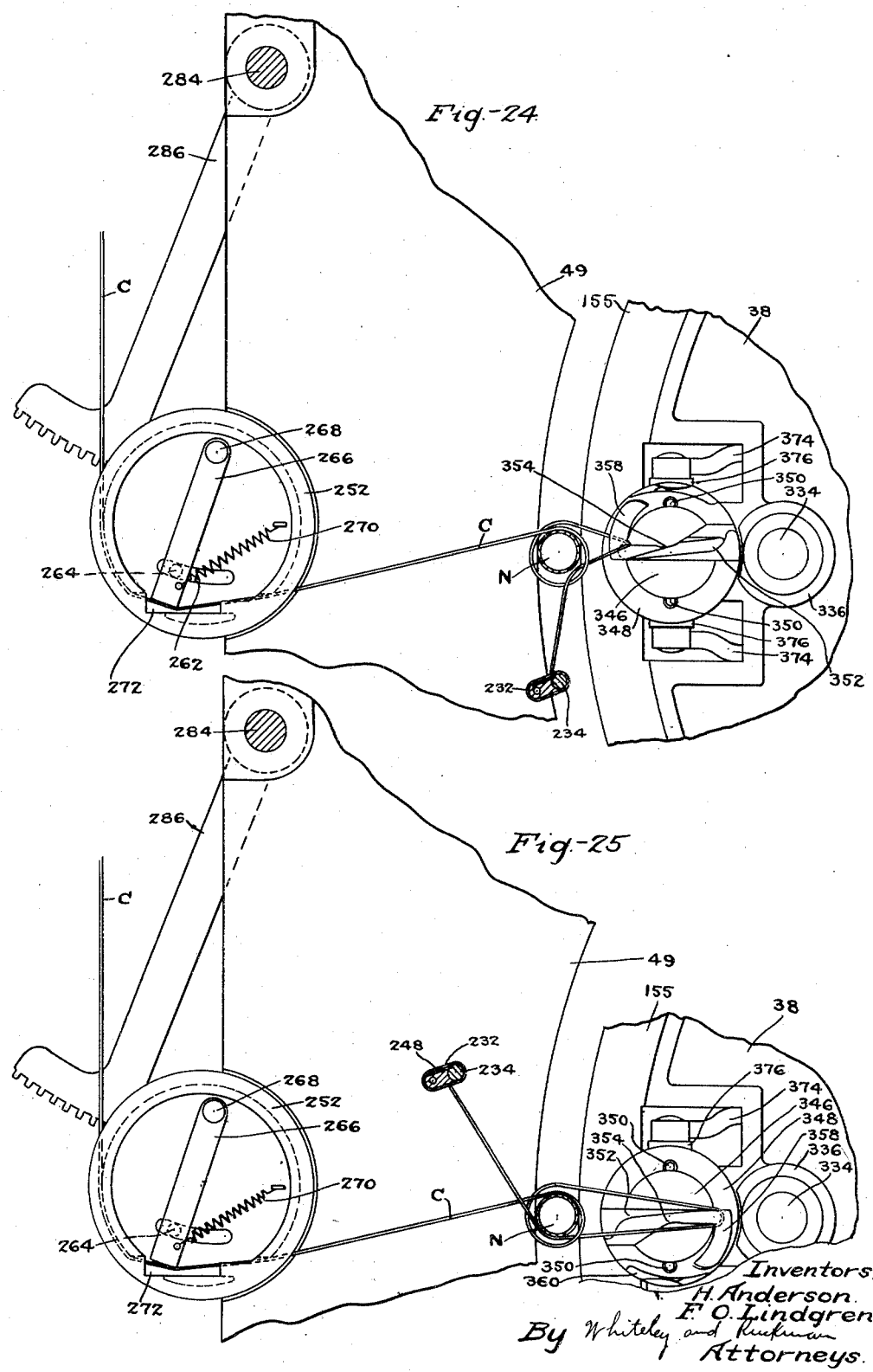

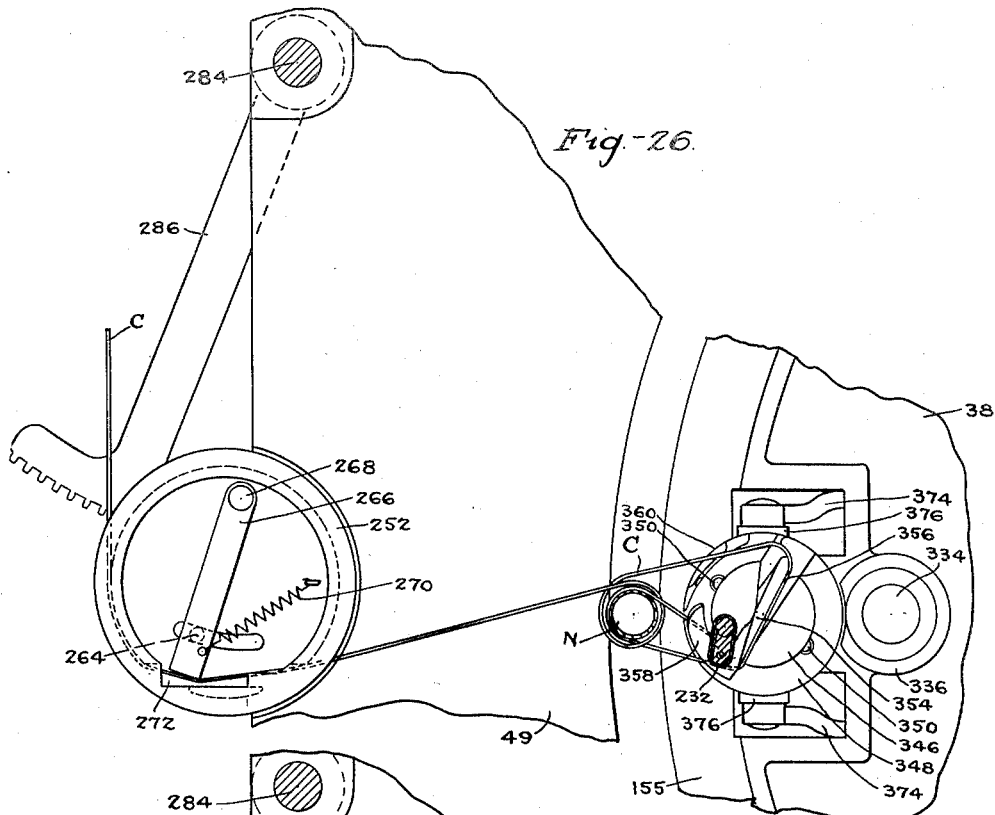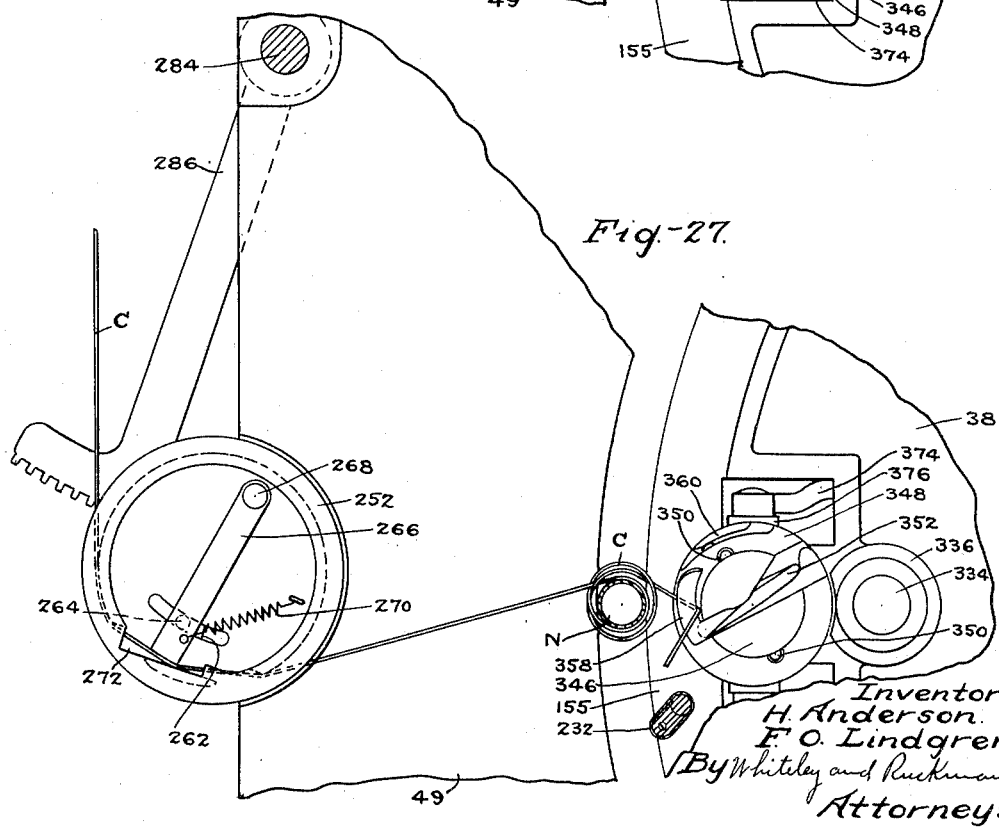

Patented Dec. 10, 1929

1,738,511

UNITED STATES PATENT OFFICE

HELMER ANDERSON AND FRANK O. LINDGREN, OF MINNEAPOLIS, MINNESOTA, ASSIGNORS TO HARDING MACHINE CORPORATION, OF NEW YORK, N. Y.

MACHINE FOR CLOSING SACKS

Application filed January 6, 1928. Serial No. 244,841.

Our invention relates to machines for closing sacks and has for an object to provide mechanism which will crimp and compact the mouth of a filled sack, lay loops of cord around the crimped and compacted mouth, arrange said loops so that the cord will be held in secured position to form a so-called "knot", tighten the latter by the action of the cord-laying mechanism, and grip the cord beyond the loops which have been formed, and sever the cord when the tying operation has been completed so that the cord will be left in condition for the succeeding tying operation. Other objects are to provide for tensioning and holding the cord to permit the cord-laying mechanism to take up slack and tighten the knot, and to initiate the cycle of operations of the knotter by the act of moving filled sacks into proper position to be tied.

The full objects and advantages of our invention will appear in connection with the detailed description thereof and the novel features of our inventive idea will be particularly pointed out in the claims.

In the accompanying drawings which illustrate a practical embodiment of our invention,—

Figure 1:
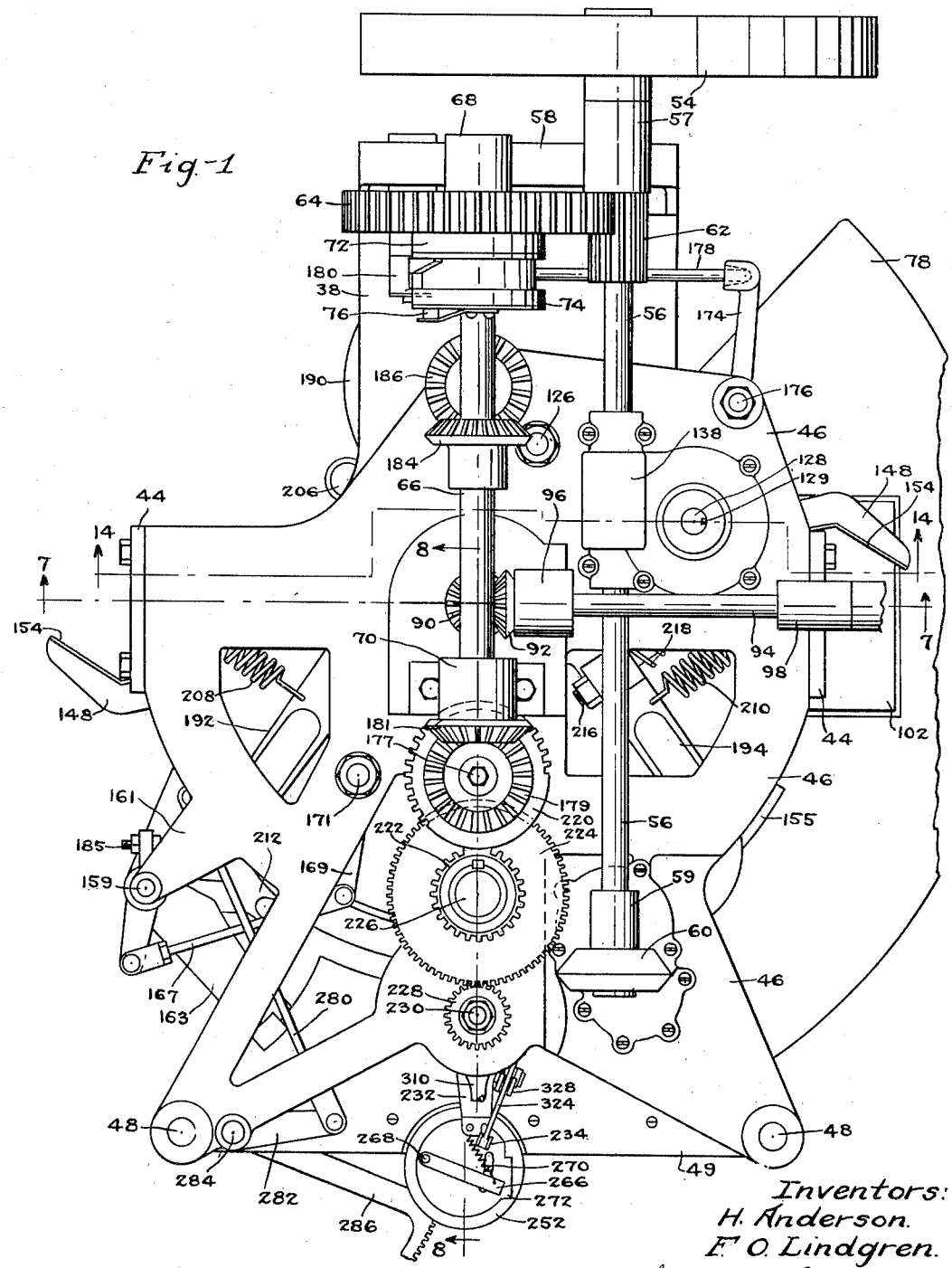
Figure 2:
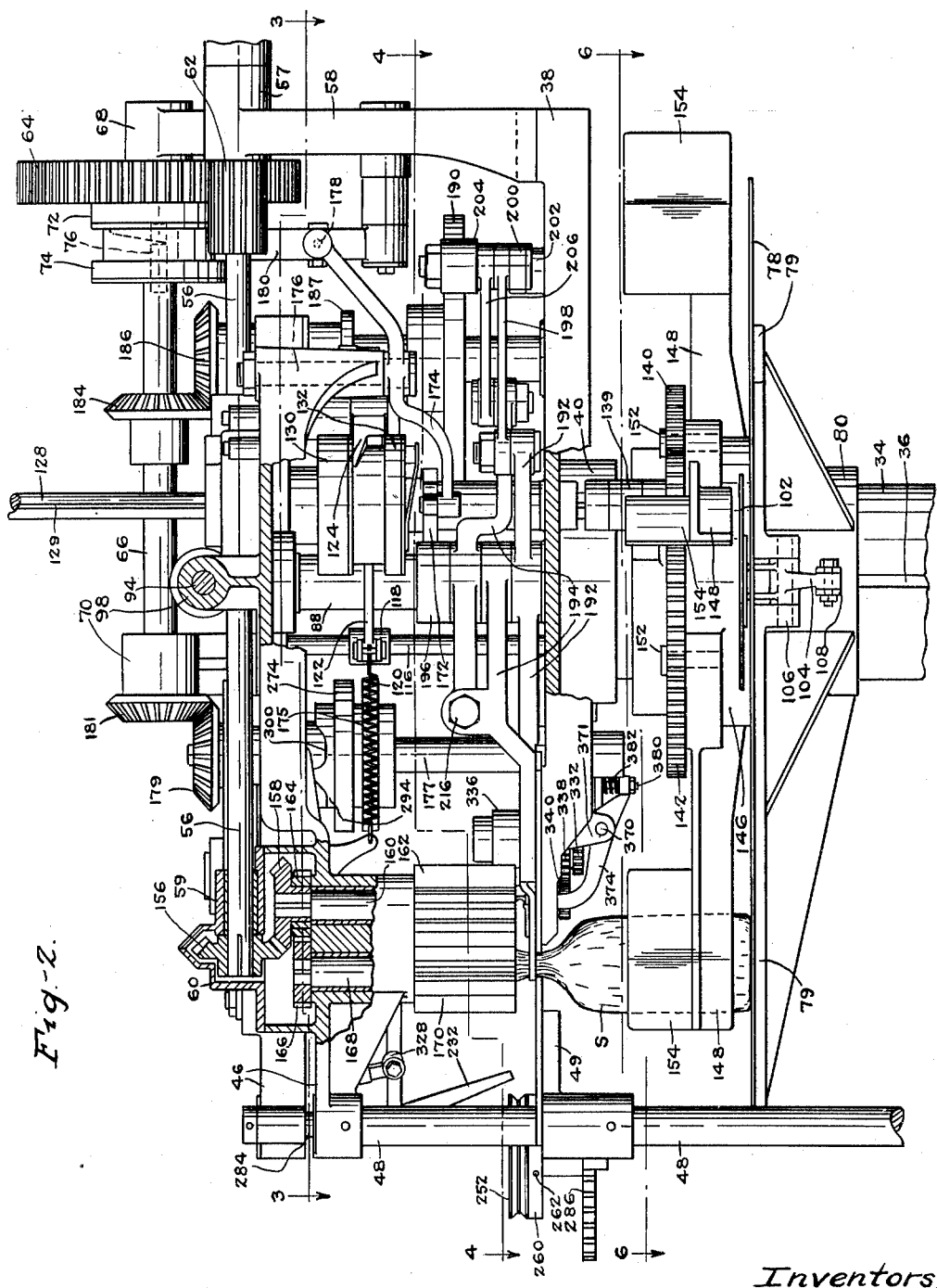
Figure 3:
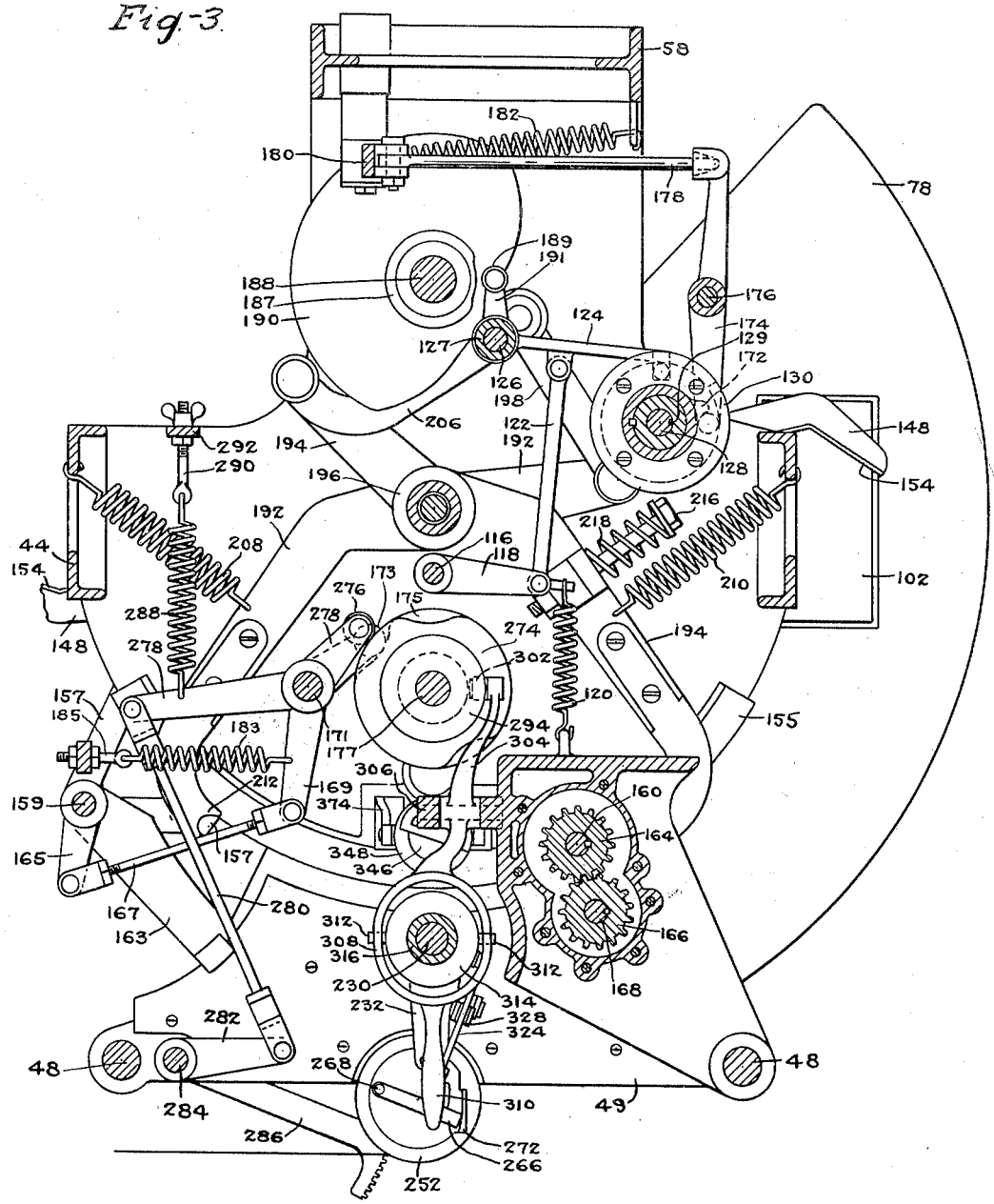
Figure 4:
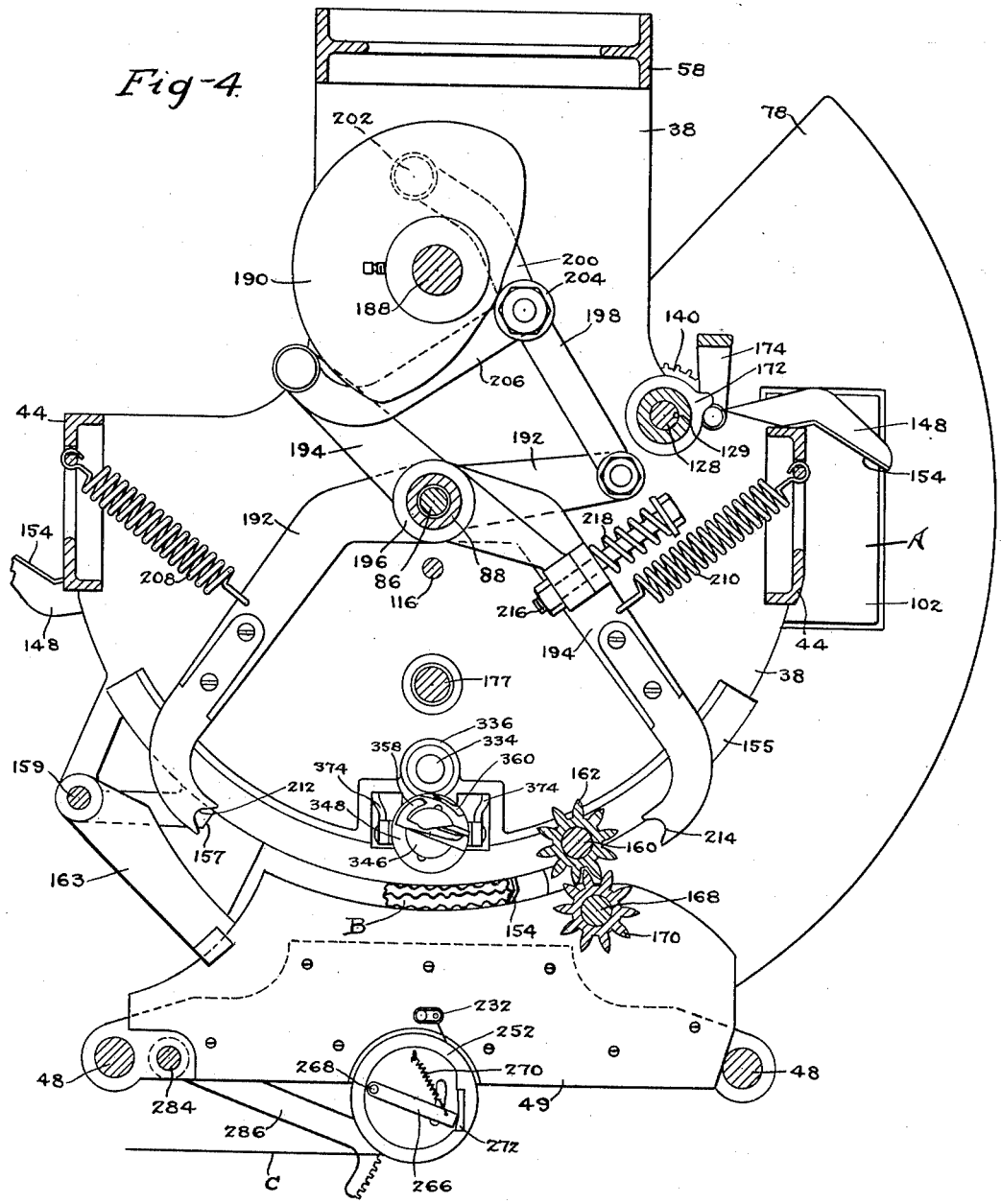
Figure 5:
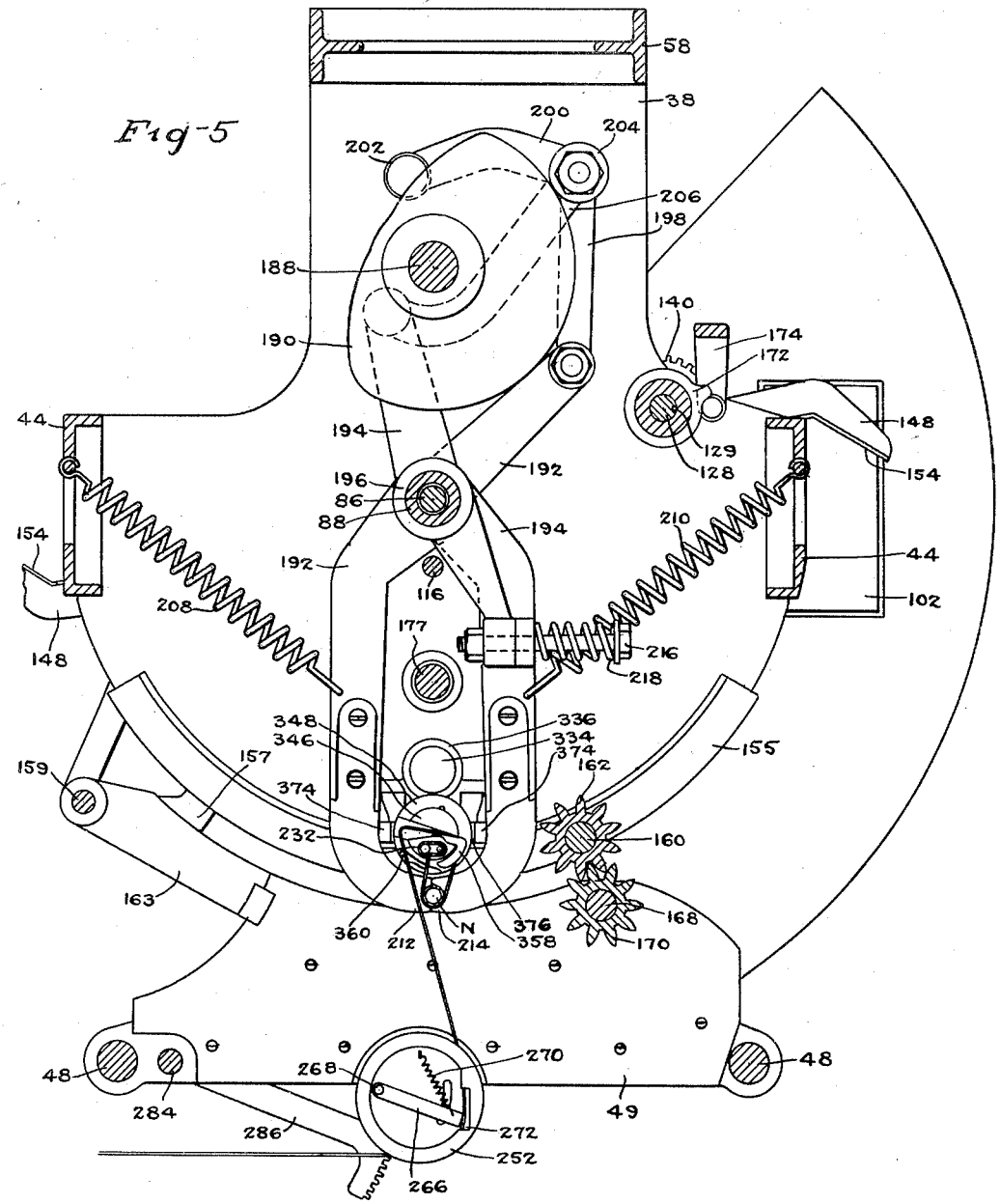
Figure 6:
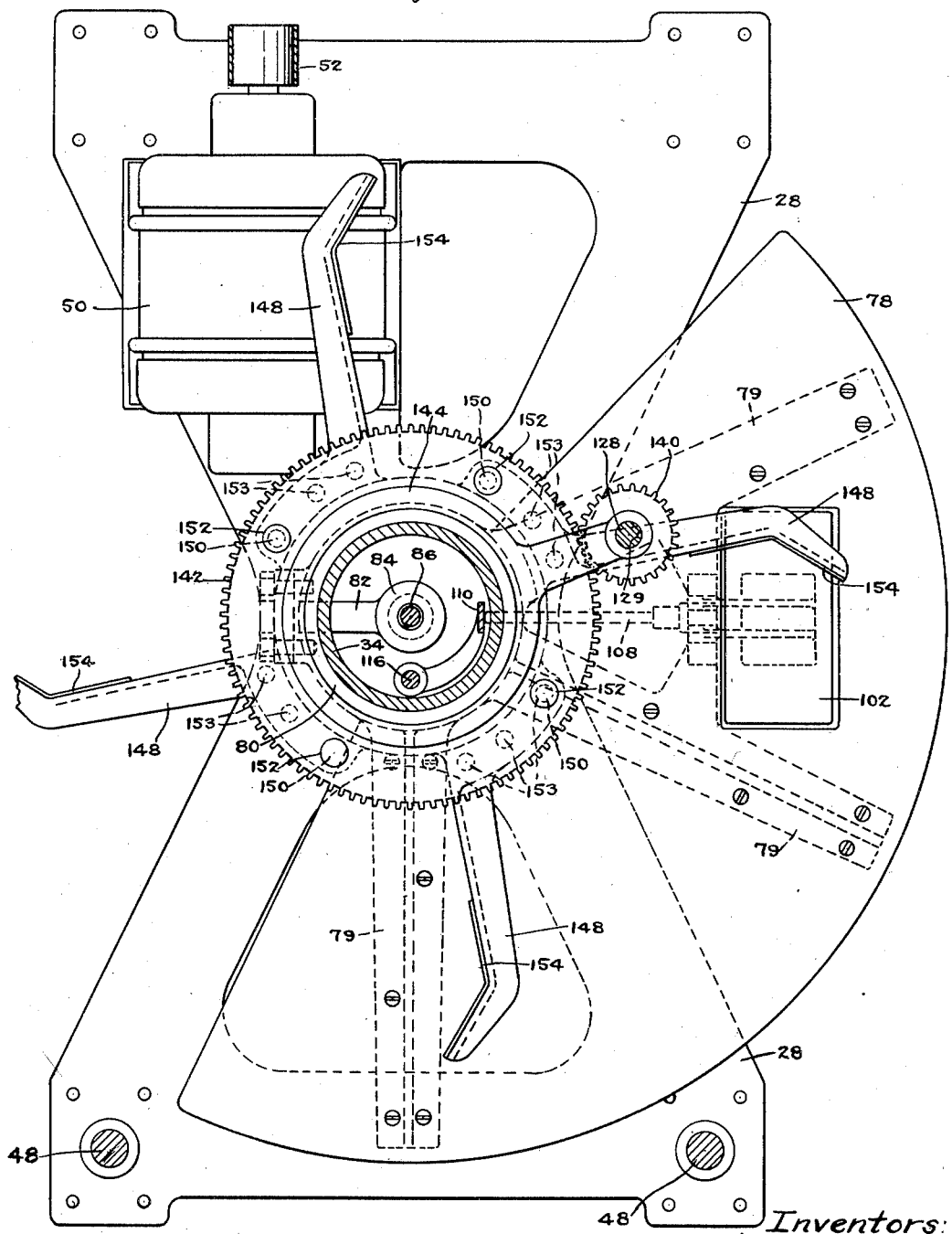
Figure 22:
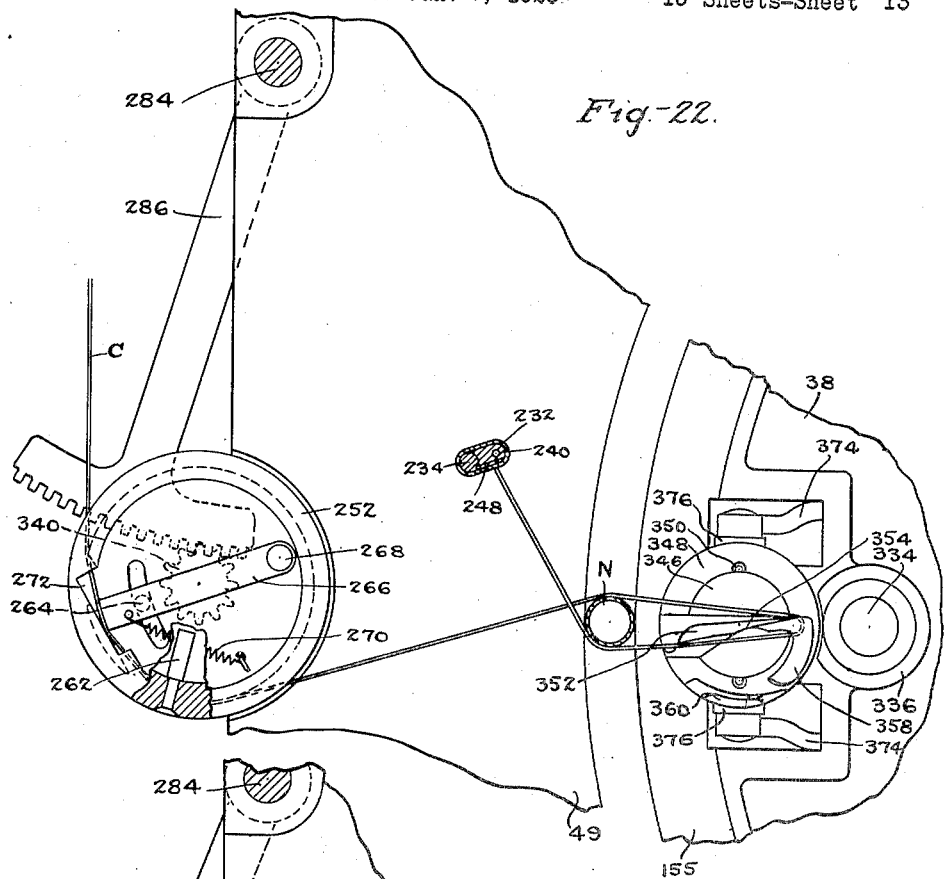
Figure 23:
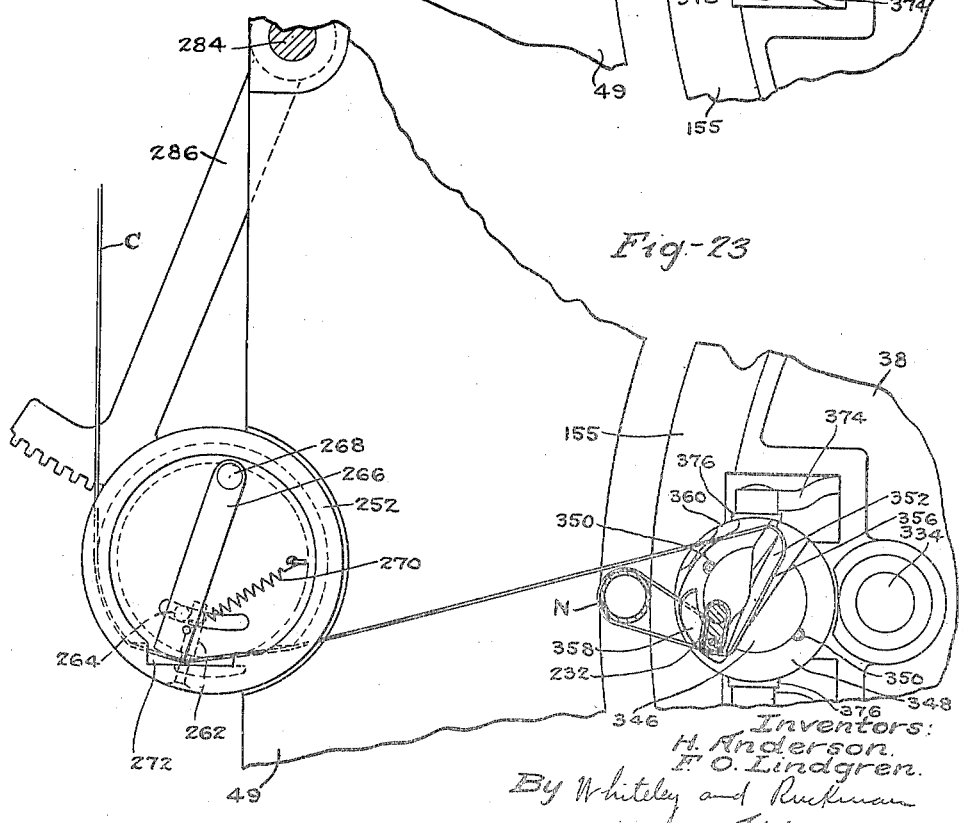

Fig. 1 is a top plan view of the machine. Fig. 2 is a side elevational view of the upper part of the machine with a small portion in section. Fig. 3 is a view in horizontal section on the line 3—3 of Fig. 2. Fig. 4 is a view in horizontal section on the line 4—4 of Fig. 2. Fig. 5 is a view similar to Fig. 4 with the compacting arms moved toward each other. Fig. 6 is a view in horizontal section on the line 6—6 of Fig. 2. Fig. 7 is a view in vertical section on the line 7—7 of Fig. 1. Fig. 8 is a view in vertical section on the line 8—8 of Fig. 1. Fig. 9 is a view similar to Fig. 8 with the cord tied and ready to be cut. Fig. 10 is a detail view in section on the line 10—10 of Fig. 12 showing a knife and plunger. Fig. 11 is a view in section on the line 11—11 of Fig. 12. Fig. 12 is a view in section on the line 12—12 of Fig. 11. Fig. 13 is a view in section on the line 13—13 of Fig. 10. Fig. 14 is a view in vertical section on the line 14—14 of Fig. 1. Fig. 15 (Sheet 11) is a view in section on the line 15—15 of Fig. 8. Fig. 16 is a view in section on the line 16—16 of Fig. 8. Fig. 17 is a view showing a development of a cam. Fig. 18 is an end view of a knotter member. Fig. 19 is a view of the completed knot. Fig. 20 (Sheet 12) is a view in section on the line 20—20 of Fig. 8 and showing the cord-laying mechanism rotated a little more than half a turn. Fig. 21 is a similar view showing the cord laying mechanism rotated a little more than one turn. Fig. 22 (Sheet 13) is a similar view showing the cord-laying mechanism rotated nearly one and one-fourth turns. Fig. 23 is a similar view showing the cord-laying mechanism rotated a little more than one and one-half turns. Fig. 24 (Sheet 14) is a similar view showing the cord-laying mechanism rotated one and three-fourths turns and the knot starting to be formed. Fig. 25 is a similar view showing the cord-laying mechanism starting on its third turn. Fig. 26 (Sheet 15) is a similar view showing the cord-laying mechanism in cord-releasing position. Fig. 27 is a similar view showing the cord released and in the process of being pulled tight.

*The machine frame.*—As shown in Fig. 7, the frame of the machine includes a base member 28 which is mounted on rollers 30. The base member 28 carries an upstanding annular flange 32 which by means of screw 33 holds the lower end of a column 34 which is provided with vertical slots 36 in its opposite sides. The upper end of this column supports a plate 38 having a downwardly extending annular flange 40 through which screws 42 pass so as to securely hold the flange to the column. Secured to the plate 38, there are standards 44 to the upper ends of which a skeleton plate 46 is secured, the shape of this plate being shown in Fig. 1. The plate 46 is secured to rods 48 which pass therethrough and whose lower ends are secured to the base 28. The rods 48 also pass through a small or supplementary plate 49 lying adjacent and in the same plane as the lower plate 38, the plate 49 being shown in Figs. 3 and 8. The frame members are preferably of metal secured rigidly together to form a firm support for the sack-feeding mechanism, the neck crimping and compacting mechanism and the cord-laying and tying mechanism.

*The sack-feeding mechanism.*—A motor 50 such as an electric motor is supported on the base 28 as shown in Fig. 7 and this motor is connected by a belt 52 with a pulley 54 secured to a driving shaft 56 having a bearing 57 in the upper end of a bracket 58 extending up from the lower plate 38 as shown in Fig. 2. The other end of the shaft 56 has a bearing 59 formed on a gear-casing 60 carried by the plate 46. A pinion 62 secured to the shaft 56 meshes with a gear 64 mounted on one end of a shaft 66 mounted in bearings 68 and 70. Loose on this shaft and secured to the gear 64 which is also loose on the shaft there is a clutch member 72 while secured to the shaft there is a cooperating clutch member 74 carrying a pin 76 normally held out of clutching engagement with relation to the member 72. This clutch is a well known one revolution clutch and hence, need not be described in detail. A segmental shaped table 78 for receiving filled sacks is secured by arms 79 to a sleeve 80 which fits around the column 34 as best shown in Fig. 7. The sleeve 80 carries a guide member 82 which extends through one of the vertical slots 36 of the column and on its inner end and centrally of the column 34 is provided with a nut member 84 in which a threaded vertical shaft 86 operates. The upper portion of the shaft 86 is rotatable in a sleeve 88 which extends between the lower and upper plates 38 and 46. Secured to the upper end of the shaft 86, there is a bevel gear 90 meshing with a bevel gear 92 secured to a shaft 94 rotatably mounted in bearings 96 and 98 carried by the upper plate 46. A crank handle 100 secured to the outer end of the shaft 94 serves to rotate the threaded shaft 86 and hence, move the table 78 up or down according to the height of sacks which are being operated upon. The table 78 is provided with an opening to accommodate a trip plate 102 upon which the operator places the filled sacks one at a time. The plate 102 is carried by the upper end of a bell crank lever 104 pivoted at 106 to a projection on the lower side of the table 78 as shown in Fig. 7. Attached to the lower arm of the bell crank 104 there is a rod 108 which passes through one of the vertical slots 36 in the column 34. As will be understood from Fig. 6, the inner end of the rod 108 engages a vertical bar 110 carried by upper and lower curved arms 112 and 114 both of which are shown in Fig. 7. These arms are secured to a vertical rod 116 rotatably mounted inside the column 34. Secured to the upper end of the rod 116 there is an arm 118 best shown in Fig. 3 normally held in the position shown by a spring 120. The arm 118 is connected by a link 122 with an arm 124 pivoted at one end on a stud 126 mounted in a boss 127 formed on the plate 46, the other end of this arm being adapted to cooperate with a one revolution clutch mounted on a vertical shaft 128. This shaft is provided with a longitudinal slot 129 which permits the shaft to slide up or down through the members keyed thereto when the table 78 is adjusted for different height of sacks. The clutch just referred to consists of two cooperating clutch members 130 and 132. The upper clutch member 130 which is loose on the shaft 128 is constantly driven from a spiral gear 134 best shown in Fig. 14 and which is also loose on said shaft. The gear 134 is driven from a spiral gear 136 secured to the driving shaft 56, the gear 136 being contained in a housing 138. It is apparent from Figs. 3, 6, and 7 that the spring 120 not only normally holds the clutch members 130 and 132 out of clutching engagement but also holds the trip plate 102 above the level of the table 78. When the operator places a filled sack on the trip plate, the clutch members 130 and 132 engage each other and the shaft 128 is caused to rotate. This shaft near its lower end is held for rotation in a bracket 139 which moves up and down with the table 78 when the latter is adjusted. Secured to the lower end of the shaft 128, there is a pinion 140 which meshes with a ring gear 142 rotatably mounted around the sleeve 80 and held thereon at the top by a collar 144 as shown in Fig. 7. A sleeve 146 surrounding the hub of the gear 142 carries four outstanding arms 148 arranged 90° from each other. As shown in Fig. 6, the upper surface of the gear 142 has a hole 150 therein associated with each of the arms 148 so that the position of these arms may be adjusted by means of a pin 152 passing through the hole 150 and into series of holes 153 in the sleeve 146. This adjustment is for the purpose of accommodating the arms to different sizes of sacks. The outer ends of these arms carry widened angular members 154 for engagement with the sacks. It should be noted that the pinion 140 and the ring gear 142 have a four-to-one ratio so that one rotation of the pinion causes a quarter rotation of the gear 142 and the arms 148 carried thereby. Therefore, when the operator places a sack on the trip plate 102, the arms 148 will make a quarter turn since the clutch members 130 and 132 constitute a one-revolution clutch. The sack will be moved by one of the arms 148 from the position marked A in Fig. 4 into the position marked B where the sack stops.

*The neck crimping and compacting mechanism.*—It should be recalled that the driving shaft 56 is running constantly. By referring to Fig. 2, it will be seen that a bevel gear 156 is secured to the rear end of the shaft 56 inside the gear casing 60. This bevel gear meshes with a bevel gear 158 secured to a shaft 160 which carries a crimping roll 162. A spur gear 164 is secured to the gear 158 and meshes with a spur gear 166 secured to a shaft 168 carrying a second crimping roll 170 which cooperates with the crimping roll 162. When a sack is pushed from the position A in Fig. 4 into the position B, the neck of the sack is caused to pass between the two crimping rolls and be crimped and flattened. It will be noted from Figs. 3 and 4 that the lower plate 38 and the adjacent small plate 49 are separated from each other by a curved gap. An arcuate strip 155 is secured to the upper side of the plate 38 with the projecting outer edge of said strip concentric with the curved edge of the plate 49, so that the crimped neck of the sack is received in the curved space as shown in Fig. 4. Near the rear end of this curved space, there is an angle shaped stop 157 which projects from the plate 38, this stop being so positioned that it will be engaged by the forward edge of the crimped sack only in the case of large sacks. The purpose of the stop is to prevent the crimped neck of large sacks from getting so far advanced that they would be beyond the range of operation of a compacting arm soon to be described. A shaft 159 is mounted for rotation in the angle of the stop 157 and in an ear 161 projecting from the upper plate 46 as shown in Fig. 1. The shaft 159 carries a gate 163 which is moved from the position shown in Fig. 3 into that shown in Fig. 5 after the sack neck has been crimped. Before the tied sack is discharged, the gate must be brought again into the open position of Fig. 3 in order to permit the neck of the sack to pass out. When the sacks are fed to the tying mechanism, the gate serves to keep the necks of the sacks in the curved slot and it acts particularly in connection with large sacks so that the necks of such sacks are kept in the curved space without liability of being torn when the neck is compacted. For operating the gate at the proper time, an arm 165 is secured to the shaft 159 and this arm is connected by a link 167 with one arm of a lever 169 intermediately pivoted on a stud 171 mounted in a boss carried by the upper plate. The other arm of this lever carries a roller 173 which engages a cam 175 secured on a shaft 177 having a bevel gear 179 secured to its upper end and meshing with a bevel gear 181 secured to the rear end of the shaft 66 previously referred to. A spring 183 secured at one end to the arm 169 and secured at its other end to a bolt 185 carried by a projection extending down from the ear 161 serves to hold the gate in open position when not closed by the cam 175. When the sack is moved into the position B, a camlike projection 172 carried by the shaft 128 as shown in Fig. 3 engages one end of a lever 174 pivoted at 176 and pushes a link 178 pivoted to the other end of the lever. This link is connected to a clutch-releasing lever 180 normally held by a spring 182 in clutch-releasing position. The pin 76 of the clutch member 74 shown in Fig. 2 now engages the clutch member 72 so that the shaft 66 is rotated. A bevel gear 184 secured to the shaft 66 meshes with a bevel gear 186 secured to a vertical shaft 188 shown in Figs. 3, 4, and 5. A cam 187 secured to the shaft 188 is rotated thereby so that the high portion of this cam engages a roller 189 mounted on an arm 191 which is integral with the arm 124 previously referred to. The sole purpose of this cam is to hold the arm 124 in clutch-releasing position so that the clutch members 130 and 132 cannot be engaged while a sack is being tied. This permits the operator to place another sack on the trip plate and it will not be moved therefrom into tying position until the preceding sack is completely tied. Another cam 190 secured to the shaft 188 serves to operate two compacting arms 192 and 194 which compact the neck of the sack after it has been crimped by passing between the crimping rolls. These two arms which cross each other in the manner of shears are pivoted intermediate their lengths on the sleeve 88 and are held in place by a collar 196 secured around the sleeve. The rear end of the arm 192 is connected by a pair of toggle arms 198 and 200 with a fixed pivot 202 carried by the plate 38. The pivotal connection of the two toggles carries a roller 204 adapted to be engaged by the high portion of the cam 190. The pivotal connection of the toggles is also connected by a link 206 with the rear end of the compacting arm 194. The two compacting arms are normally held in retracted position by springs 208 and 210 respectively, as shown in Figs. 3 and 4. The front ends of the compacting arms carry compacting jaws 212 and 214 respectively which slide on the plate 155. When the roller 204 is engaged by the cam 190, the compacting arms will be moved into the position shown in Fig. 5 to compact the neck of the sack as indicated at N. The compacting arms are so arranged as to firmly compact the necks of the smallest type of sack used. Therefore, in order to provide yielding movement for larger types of sacks, the arm 194 is made in two parts with a bolt 216 passing therethrough and encircled by a spring 218. The high portion of the cam 190 is in the form of a circumference extending for nearly 180° so as to keep the compacting jaws in engagement with the compacted sack neck during the tying operation.

*The cord-laying and tying mechanism.*—This mechanism is operated from the shaft 177. A gear 220 is secured to the shaft 177 just below the bevel gear 179. The gear 220 meshes with a gear 222, both of these gears being intermittent or mutilated gears in order to provide a period of dwell so that the compacting arms may come into engagement with the neck of the sack just before the tying operation commences and so that the compacting arms may be given time to be released after completion of a tying operation and be ready for operating on the next sack. The gear 222 and a spur gear 224 are secured together for rotation on a stud 226 mounted on the plate 46, the gear 224 meshing with a spur gear 228 mounted on a shaft 230 which drives a cord-layer designated in general by the numeral 232 especially in regard to a finger portion thereof. This cord-layer is shown in detail in Figs. 10 to 13 and comprises a casing or hollow finger in which a rod 234 is slidably mounted. This rod has a projection 236 extending laterally therefrom and through which a bolt 238 passes slidably. The lower end of the bolt 238 carries a cord-clamping member 240 adapted to cooperate with a clamping member 242 extending out from the rod 234. The casing 232 at its upper portion is provided with a longitudinal partition 244 which forms a compartment for a spring 246 whose purpose is to tension the clamping member 240 into engagement with the clamping member 242. As best shown in Fig. 12, a knife 248 is secured inside the casing 232 at the lower end thereof. The cord-layer includes a horizontal arm 250 secured at one end to the lower end of the shaft 230 and at its other end carrying the casing or finger member 232 of the cord-layer. The cord C comes from any suitable source of supply and passes through and partly around a tension sheave 252 secured to a shaft 254 which passes through a bearing 256 carried by the supplemental plate 49, there being a gear 258 secured to the lower end of this shaft. A ring 260 is interposed between the sheave and the plate 49 and is secured to the latter. The ring 260 carries a pin 262 extending radially toward the center thereof and adapted to be engaged by a pin 264 carried by a tension arm 266 pivoted at 268 to the sheave 252. A spring 270 secured to the sheave and to the arm 266 tends to pull the arm 266 toward the right as viewed in Fig. 20. The cord passes through a hole made in the grooved portion of the sheave 252 at one edge thereof while the material of the sheave is cut away adjacent the hole to produce a recess 272 for the end of the arm 266 to swing in for the purpose of clamping the cord. In order to operate the arm 266, a cam 274 is secured to the shaft 177. The cam 274 engages a roller 276 mounted on one end of a bell crank 278 pivoted on the pin 171 and whose other arm is connected by a link 280 to a lever 282 fastened to a shaft 284 rotatably held by the upper plate and the supplemental plate. Fastened to the lower end of the shaft 284, there is a gear quadrant 286 which engages the gear 258 which is secured to the shaft 254 of the tension sheave 252. A spring 288 secured to the outer arm of the bell crank 278 and to a bolt 290 passing through a lug 292 on the upper plate holds the roller 276 in engagement with the cam 274. When this roller is on the high portion of the cam 274, the sheave 252 is in the position shown in Fig. 20 which allows the cord to be drawn freely through the sheave because the arm 266 is held back by the radial pin 262, thereby preventing locking of the cord in the recess 272. Secured to the shaft 177, there is a cam 294 having a groove 296 around its periphery, this groove containing two depressions marked 298 and 300. Working in the groove, there is a roller 302 mounted on one end of a lever 304 intermediately pivoted at 306 and the other end of which is formed into a ring portion 308 carrying a handle 310. The ring 308 has diametrically opposite slots 311 in which there are pins 312 carried by a spool-like member 314 slidable on a sleeve 316 surrounding the shaft 230 and having a flange 318 secured to the upper plate 46. The spool 314 has a circumferential groove 320 shown in Fig. 8 in which there is a roller 322 carried by one end of a lever 324 pivoted at 326 to one end of a link 328 whose other end is pivoted to the arm 250. The outer end of the lever 324 is pivoted to the rod 234 which carries the lower clamping member 242. The depression 300 allows the operator to restore the cord to its proper position between the upper and lower clamping jaws 240 and 242 in case the cord should accidentally pull loose.

By pulling up on the handle 310, the lower member 242 is depressed so that the operator may place the cord between the two clamping members. Referring again to the shaft 177, it will be seen that secured thereto near its lower end, there is a gear 330 meshing with a gear 332. These gears are intermittent gears having mutilated portions to produce a dwell corresponding to the dwell of the intermittent gears 220 and 222. The gear 332 is secured to a stub shaft 334 mounted in a bearing 336 extending up from the lower plate 38. A spur gear 338 is secured for rotation with the gear 332, the gear 338 meshing with a spur gear 340 secured to a shaft 342 mounted in roller bearings 344. The shaft 342 carries at its upper end, a knotter consisting of an inner member 346 secured rigidly to said shaft and there is an annular member 348 surrounding the member 346 for sliding movement thereon. The members 346 and 348 are normally held in the position shown in Fig. 8 by a pair of coiled springs 350 placed in recesses between the two members. Extending up from the inner member 346, there is a projection 352 which is beveled as shown in Fig. 18 and is also beveled at right angles to the first bevel as shown in Fig. 15 so as to form an apex 354. The body portion of the projection 352 is provided with a groove 356 which extends along the wide face of the projection as shown in Figs. 15 and 20, this groove at one end tapering out to the surface of the projection and at the other end passing under a cord-guide and clamp 358 which in effect constitutes an extension of the projection 352. Extending up from the margin of the annular member 348 there is a projection 360 which constitutes a cord-guide during the rotation of the knotter and works in conjunction with the projection 352. In order to slide the annular member 348 upwardly near the close of the tying operation, a disk 362 is secured to the lower end of the shaft 177 and this disk carries a cam projection 364 adapted to engage a roller 366 carried by an arm 368 which is rotatably mounted on a shaft 370 supported in lugs 371 carried by the lower plate 38. Mounted rotatably on the shaft 370 is a sleeve 372 carrying a pair of arms 374 which at their outer ends carry rollers 376 which engage the under surface of the annular member 348. One of the arms 374 has an extension 378 which is connected for movement with the arm 368 by means of a bolt 380 passing through the extension 378 and through the arm 368 and surrounded by a coiled spring 382 whereby the annular member 348 will be lifted under spring pressure.

*Operation of the cord-laying and tying mechanism.*—Both the cord-layer and the knotter are given three rotations for one rotation of the operating shaft 177 on account of the gear ratio of the interposed gearing. Successive positions of the cord-layer and knotter are shown in Figs. 20 to 27. In Fig. 20, the cord layer and knotter have made a little more than one-half a turn from initial position, the cord being part way around the sack neck and starting to go under the guide 358 of the knotter. Tension on the cord is off so that the cord may be drawn freely from the source of supply. In Fig. 21, the cord layer and knotter have made a little over one turn from initial position and the cord has passed completely under the guide 358. The cam 274 which operates the gear quadrant 286 has just started to cause tension and, therefore, slack in the cord is taken up as the mechanism moves on into the position shown in Fig. 22 in which the mechanism has made a little less than one and one-fourth turns and the slack has been taken up. In Fig. 23, the mechanism has made a little more than one and one-half turns and the cord is now in position where it is nearly ready to slide off the apex 354 of the projection 352. This is the time when the projection 360 comes into action since it prevents the cord from fully slipping off the apex 354 until the cord end which lays in the groove 356 is allowed to slide from under the guide 358 and it also prevents the cord which leads from the groove 356 and over the projection 360 from sliding under the guide 358, thus causing the portion of the cord which is fastened to the cord-layer to go under the guide 358 and thereby making the first portion of the knot as shown in Fig. 24 in which position the mechanism has made one and three-fourths turns. In Fig. 25, the mechanism has made two and one-fourth turns and it takes up the slack in the cord which has been passed around the sack neck. In Fig. 26, the mechanism has made about two and one-half turns and since it is in the same angular position as shown in Fig. 23, the operation described in connection with the latter figure is repeated and the second portion of the knot is about to be formed. The end of the cord is now about ready to be released from the clamp of the cord-layer on account of the roller 302 moving into the depression 298 of the cam 294. At the same time, the cam 364 forces the annular member 348 upwardly so as to start taking hold of the cord by means of the member 352. In Fig. 27, the tension on the sheave has just started and the end of the cord has been released from the cord-layer. This end of the cord is now gripped between the members 348 and 358, so that the surplus cord will be pulled up tight around the sack neck on account of the member 348 and the sheave 252 both moving away from the neck of the sack. By referring to Fig. 3 it will be understood that the sheave 352 is partially rotated in clockwise direction by the action of the adjustable spring 288. When the mechanism moves into initial position as shown in Fig. 4, the cam 294 causes the roller 302 to ride up in the groove 296 thereby causing the knife 248 to cut the cord and causing the new end to be clamped in the cord-layer ready for another tying operation. Fig. 9 shows substantially the initial position except that the clamp and the knife have not yet been drawn up.

The operation of the machine has been quite fully given in the preceding description and the advantages of the machine will be readily understood by those skilled in the art. The invention comprises a relatively simple and highly efficient machine for operating upon filled sacks of any desired size and height in such manner as to gather the mouth thereof, lay loops of cord around the gathered mouth, anchor both ends of the loops to form a knot such as illustrated in Fig. 19, cut the cord beyond the knot, and leave the remaining end of the cord which comes from the cord supply attached to the cord-layer so that loops may be formed around the gathered mouths of succeeding sacks.

We claim:

1. In a machine for closing sacks, the combination of a driving shaft, sack-feeding-mechanism, a clutch through which said driving shaft drives said feeding mechanism, means normally holding said clutch in disengaged position, a trip device, connections between said trip device and said clutch adapted to bring the latter into engaged position when said trip device is engaged by a sack, tying mechanism including a cord knotter to which the sacks are fed by said feeding mechanism, and means for preventing engagement of said clutch while said tying mechanism is operating.

2. In a machine for closing sacks, the combination of a driving shaft, a table, a trip plate carried by said table, rotatable sack-feeding arms, a clutch through which said driving shaft drives said arms, means normally holding said clutch in disengaged position, connections between said trip plate and said clutch adapted to bring the latter into engaged position when a sack is placed on said trip plate, sack closing mechanism to which the sacks are fed by said feeding arms, and means for preventing engagement of said clutch while said closing mechanism is operating.

3. In a machine for closing sacks, the combination of a driving shaft, sack-feeding mechanism operated by said driving shaft, crimping rolls between which the necks of the sacks are fed by said feeding mechanism, tying mechanism adjacent which the crimped sacks are placed by said feeding mechanism, a pair of oscillating compacting arms, a stationary pivot for said arms, and mechanism for causing said arms to engage opposite sides of the crimped necks before the tying mechanism starts to operate and to remain in engagement with the compacted necks during the tying operation.

4. In a machine for closing sacks, the combination of a driving shaft, sack-feeding mechanism operated by said driving shaft, crimping rolls between which the necks of the sacks are fed by said feeding mechanism, tying mechanism adjacent which the crimped sacks are placed by said feeding mechanism, said tying mechanism being mounted above an arcuate gap which receives the crimped necks, a pair of compacting members, a stationary pivot for said members, mechanism for causing said compacting members to engage opposite sides of the crimped necks before the tying mechanism starts to operate and to remain in engagement with the compacted necks during the tying operation, a gate at the rear portion of said arcuate gap which completes the latter during the tying operation, and mechanism for opening said gate at the end of the tying operation to provide a discharge passage.

5. In a machine for closing sacks, the combination of a driving shaft, sack-feeding mechanism operated by said driving shaft, crimping rolls between which the necks of the sacks are fed by said feeding mechanism, tying mechanism adjacent which the crimped sacks are placed by said feeding mechanism, said tying mechanism being mounted above an arcuate gap which receives the crimped necks, a pair of oscillating compacting arms, a stationary pivot for said arms, means for causing said arms to engage opposite sides of the crimped necks before the tying mechanism starts to operate and to remain in engagement with the compacted necks during the tying operation, and a stop at the rear of said arcuate gap which prevents the crimped necks of large sacks from moving beyond the range of action of the compacting arm which engages the rear side of the crimped necks.

6. In a machine for closing sacks, the combination of a driving shaft, sack-feeding mechanism, a clutch through which said driving shaft drives said feeding mechanism, means normally holding said clutch in disengaged position, a trip device, connections between said trip device and said clutch adapted to bring the latter into engaged position when said trip device is engaged by a sack, crimping rolls constantly driven by said driving shaft and between which the necks of the sacks are fed by said feeding mechanism, tying mechanism adjacent which the crimped sacks are placed by said feeding mechanism, compacting mechanism for compacting the crimped necks when the sacks are in tying position, a second clutch through which said driving shaft operates said tying mechanism and compacting mechanism, means normally holding said second clutch in disengaged position, means for causing said clutch to be engaged after said feeding mechanism has operated, and means which causes said compacting mechanism to be operated just before said tying mechanism operates.

7. In a machine for closing sacks, the combination of a driving shaft, a table, a trip plate carried by said table, rotatable sack-feeding arms, a one-revolution clutch through which said driving shaft drives said feeding arms, means normally holding said clutch in disengaged position, connections between said trip plate and said clutch adapted to bring the latter into engaged position when a sack is placed on said trip plate, gearing associated with said sack-feeding arms which causes them for each revolution of said clutch to make that part of a rotation which corresponds to the number of said arms, and tying mechanism to which the sacks are fed by said arms.

8. In a machine for closing sacks, the combination of a driving shaft, a table, a trip plate carried by said table, a rotatable member, sack-feeding arms extending out from said rotatable member, adjustable means for changing the positioning of said feeding arms relatively to said rotatable member for different sizes of sacks, a clutch through which said driving shaft drives said rotatable member, means normally holding said clutch in disengaged position, connections between said trip plate and said clutch adapted to bring the latter into engaged position when a sack is placed on said trip plate, and tying mechanism to which the sacks are fed by said feeding arms.

9. In a machine for closing sacks, the combination of a base member, a column extending up from said base member and having a longitudinal slot therein, a sleeve slidably mounted around said column, a guide carried by said sleeve extending through said slot, a nut member carried by the inner end of said guide, a threaded shaft extending through said nut member, a table carried by said sleeve, means for rotating said threaded shaft to move said table up and down for different height of sacks, a second sleeve rotatable around said column, means for rotating said second sleeve, sack-feeding arms extending out from said second sleeve, and tying mechanism to which sacks are fed by said feeding arms.

10. In a machine for closing sacks, the combination of a driving shaft, a table, a support for said table, means for moving said table up and down for different height of sacks, a trip plate carried by said table, rotatable sack-feeding arms, a clutch shaft movable up and down with said table, driving connections between said clutch shaft and said feeding arms, a clutch through which said clutch shaft is adapted to slide, means for driving one of the members of said clutch from said driving shaft, means normally holding the members of said clutch in disengaged position, connections with said trip plate for bringing the members of said clutch into engaged position when a sack is placed on said trip plate, and tying mechanism to which the sacks are fed by said feeding arms.

11. In a machine for closing sacks, the combination of a driving shaft, a table, a trip plate carried by said table, rotatable sack-feeding arms, a one-revolution clutch through which said driving shaft drives said feeding arms, means normally holding said clutch in disengaged position, connections between said trip plate and said clutch adapted to bring the latter into engaged position when a sack is placed on said trip plate, tying mechanism to which the sacks are fed by said feeding arms, a second one-revolution clutch through which said driving shaft drives said tying mechanism, means normally holding said second clutch in disengaged position, and means for placing said second clutch into engaged position after a sack has been fed by said feeding arms.

12. In a machine for closing sacks, the combination of a driving shaft, a table, a trip plate carried by said table, rotatable sack-feeding arms, a one-revolution clutch through which said driving shaft drives said feeding arms, means normally holding said clutch in disengaged position, connections between said trip plate and said clutch adapted to bring the latter into engaged position when a sack is placed on said trip plate, crimping rolls between which the necks of the sacks are fed by said feeding arms, tying mechanism to which the sacks are fed by said feeding arms, compacting mechanism for the crimped necks, a second one-revolution clutch through which said driving shaft drives said tying mechanism and said compacting mechanism, means normally holding said second clutch in disengaged position, means for placing said second clutch in engaged position after a sack has been fed by said feeding arms, means for causing said compacting mechanism to operate before said tying mechanism starts to operate, and means for preventing engagement of said first clutch while said tying mechanism is operating.

13. In a machine for closing sacks, the combination of a driving shaft, a cord-laying device adapted to rotate around the necks of the sacks, a rotatable knotter adapted to engage the cord during the cord-laying operation, and connections with said driving shaft which cause both said cord-laying device and said knotter to rotate simultaneously three times and in the same direction for one rotation of said shaft.

14. In a machine for closing sacks, the combination of a driving shaft, a cord-laying device adapted to rotate around the necks of the sacks, a rotatable knotter adapted to engage the cord during the cord-laying operation, connections with said driving shaft which cause both said cord-laying device and said knotter to rotate simultaneously in the same direction, and mechanism whereby both ends of the laid cord are pulled tight at the end of the tying operation.

15. In a machine for closing sacks, the combination of a driving shaft, a cord-laying device adapted to rotate around the necks of the sacks, a rotatable knotter adapted to engage the cord during the cord-laying operation, connections with said driving shaft which cause both said cord-laying device and said knotter to rotate simultaneously, a sheave through the margin of which the cord passes on its way to said cord-laying device, a tension arm pivoted to said sheave, and mechanism for giving said sheave a movement of rotation after the cord-laying operation has started to cause said tension arm to grip the portion of the cord which passes through the margin of said sheave.

16. In a machine for closing sacks, the combination of a driving shaft, a hollow cord-laying finger, connections between said driving shaft and said finger for causing the latter to rotate around the necks of sacks, a rod extending slidably and longitudinally through said finger, a clamping member on the lower end of said rod, a cooperating clamping member carried by said finger and arranged to normally engage said first clamping member, and mechanism operative near the end of the cord-laying operation for depressing said rod to move the clamping member carried thereby away from said cooperating clamping member.

17. In a machine for closing sacks, the combination of a driving shaft, a hollow cord-laying finger, connections between said driving shaft and said finger for causing the latter to rotate around the necks of sacks, a rod extending slidably and longitudinally through said finger, a clamping member on the lower end of said rod, a cooperating clamping member carried by said finger and arranged to normally engage said first clamping member, a rotatable cam member having a cam groove with an offset portion around its periphery, connections between said cam member and said rod whereby said offset portion depresses said rod to move the clamping member carried thereby away from said cooperating clamping member near the end of the cord-laying operation, said cam groove having a depression therein, and a handle member adapted to be moved by the operator to place the cam-engaged end of said connections in said depression to separate said clamping members and permit reclamping of the cord in case it becomes accidentally disengaged from said clamping members.

18. In a machine for closing sacks, the combination of a driving shaft, an inner knotter member, connections for rotating said member from said driving shaft, an annular knotter member slidably carried by said inner knotter member, cooperating projections carried by said knotter members for forming a knot, and mechanism for sliding said annular member to engage the free end of the cord and pull it tight at the end of the tying operation.

19. In a machine for closing sacks, the combination of a driving shaft, an inner knotter member, connections for rotating said member from said driving shaft, an annular knotter member slidably carried by said inner knotter member, a projection extending up from said inner knotter member, said projection being beveled to form an apex, a second projection carried by said inner knotter member at the side of said first projection, said second projection constituting a cord-guide and clamp, a projection extending up from said annular knotter member to constitute a cord-guide, and mechanism for sliding said annular member to engage the free end of the cord between the same and said second projection and pull said end tight at the end of the tying operation.

20. In a machine for closing sacks, the combination of a driving shaft, a cord-laying device for placing loops of cord around the necks of the sacks, a rotatable knotter, connections with said driving shaft which cause both said cord-laying device and said knotter to rotate simultaneously, and projections carried by said knotter which cause one end portion of the looped cord to be anchored under one of said loops and the other end portion of the looped cord to be anchored under another one of said loops.

In testimony whereof we hereunto affix our signatures.

HELMER ANDERSON.
FRANK O. LINDGREN.